Sept. 20, 1927.  1,642,829

J. RYDEN ET AL

ADJUSTABLE CLAMP

Filed May 15. 1926

Inventors
John Ryden
Carl Gustavson
By Nilson + McCanna Attys

Patented Sept. 20, 1927.

1,642,829

UNITED STATES PATENT OFFICE.

JOHN RYDEN AND CARL GUSTAVSON, OF ROCKFORD, ILLINOIS.

ADJUSTABLE CLAMP.

Application filed May 15, 1926. Serial No. 109,205.

This invention relates to clamps such as are adapted for use in clamp machines extensively used in woodworking for the holding of work after the gluing thereof.

The principal object is to provide an adjustable clamp of the kind referred to for bench or machine work having adjustable jaws to suit different heights and shapes of work, the jaws being adjustable as to height to meet the first condition, and being tiltable to meet the second condition.

Another object is to provide a clamp having the jaws thereof adjustable so as to locate the center line of pressure between the jaws approximately midway of the height of the work to secure substantially even distribution of pressure and thereby improve the grade of work produced.

In the carrying out of the above objects our invention contemplates the use of accessory devices capable of application to the conventional standard type of bar clamp to secure the desired results and make the standard clamp capable of a wider range of uses.

The invention is illustrated in the accompanying drawing, wherein—

Figure 1:
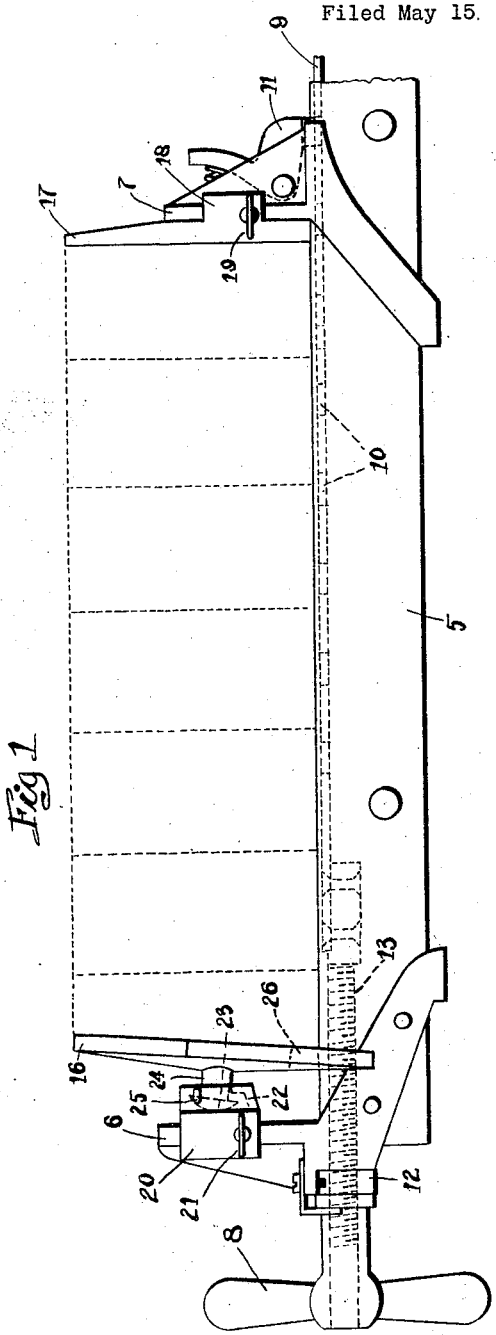
Figure 2:
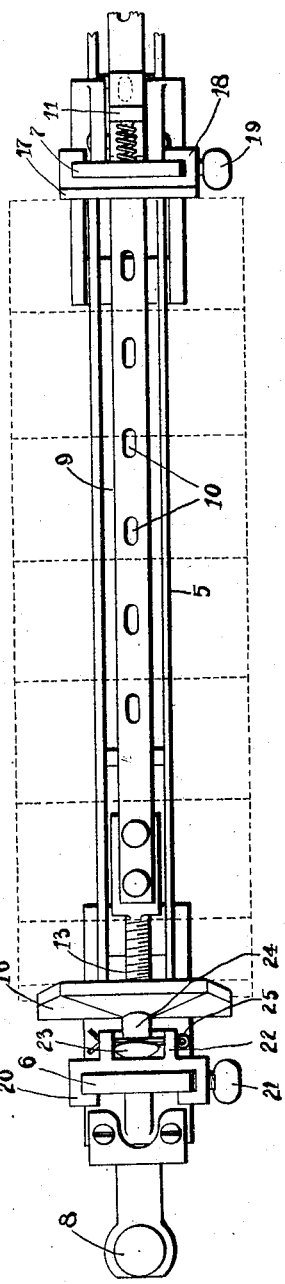

Fig. 1 is a side view of a standard type of bar clamp equipped with adjustable jaws in accordance with our invention; and Fig. 2 is a plan view of Fig. 1.

The present invention is capable of application with equal facility as an accessory to various types of bar clamps. The one shown is selected merely for the purposes of convenience in illustration and comprises the conventional bar 5 having a fixed jaw 6 and a movable jaw 7, the latter being operated by the turning of a handle 8 in a manner well known in the art. The bar 5, it will be noted, comprises spaced members between which a rod 9 is arranged, having a plurality of longitudinally spaced slots 10 therein to receive the spring pressed latch 11 for the selective location of the jaw 7. The jaw 7 is drawn toward the jaw 6 by the turning of a nut 12 on the threaded stud 13 secured to the end of the rod 9. This brief description will suffice to convey a general understanding of the type of clamp to which the present improvements are particularly designed for application. The clamp obviously may be used on a machine or apart therefrom.

According to the present invention a pair of auxiliary jaws 16 and 17 are employed in the nature of accessories to the main jaws 6 and 7 to be adjustable as to height in relation to the bar 5 to suit different heights of work while the one jaw 16 is also capable of tilting in the manner illustrated to adapt itself to the shape of the work. The jaw 17 has a clamp 18 thereon comprising lateral jaws preferably formed integral therewith and arranged to embrace the opposite sides of the main jaw 7, as illustrated. A thumb screw 19 in the clamp 18 is provided to hold the jaw 17 in its adjusted position. The jaw 16 on the other hand while also adjustable vertically on the main jaw 6 by means of a clamp 20 and a thumb screw 21, is not rigid like the jaw 17 but is flexibly mounted for universal tilting in a socket 22 provided on the front of the clamp 20. The socket 22 receives a head 23 provided in the form of an enlargement on the end of a neck 24 extending from the back of the jaw 16 and formed preferably integral therewith. The head 23 is retained in the socket 22 in any suitable manner and preferably by a cotter pin 25. The jaw 16 is held against lateral displacement by bifurcating the lower end thereof to straddle the bar 5. A notch, indicated at 26, is provided in the lower edge of the jaw 16 to receive the bar 5 for the purpose referred to.

In operation both of the auxiliary jaws 16 and 17 are adjusted vertically in relation to the bar 5 to suit the height of the work to be handled. The adjustment of the jaw 16 is, moreover, made with a view to disposing the clamp 20 thereof approximately half the height of the work. This locates the center line of pressure between the two jaws approximately midway of the height of the work. In this way, the pressure is evenly distributed over the area of the work and the character of the gluing is improved. It is obvious that the invention avoids two of the more outstanding objections to the present standard type of clamp in providing for adjustability as to the height of the work to be handled so that wide pieces of stock are handled with equal facility as narrow pieces, and in providing for the inclination of at least one of the jaws to accommodate itself to the work and insure even pressure over the entire glued area. The adjustment of the tiltable jaw to a point half the height of the work in order properly to locate the center line of pressure between the two jaws, serves of course to further the even distribution of pressure. In the ordinary standard clamp there was no way of insuring even distribution of pressure for different widths or heights of work.

It is believed that the foregoing description conveys a clear understanding of the invention and of its purposes and advantages so that any one skilled in the art to which the invention relates will appreciate the possible applications thereof.

We claim:

1. In a clamp comprising a bar and a pair of jaws presenting opposed flat and parallel faces for clamping work therebetween when one of the jaws is adjusted toward the other, a pair of auxiliary jaws arranged to be removably mounted on said main jaws in front of the clamping faces thereof, said auxiliary jaws having holding means on the backs thereof arranged to be vertically adjustable on the main jaws whereby the auxiliary jaws are adjustable above the height of the main jaws to increase the capacity of the clamp as respects the height of the work to be handled.

2. In a structure as set forth in claim 1, the provision with one of the auxiliary jaws of a flexible connection in the holding means, whereby the auxiliary jaw is adjustable not only as to height but also as to inclination so as to conform itself to the work being handled.

3. In a clamp, the combination with a bar and a clamping jaw thereon presenting a broad flat face for engagement with work to be clamped, of an auxiliary jaw to be removably mounted in front of the clamping face of the main jaw and to be adjustable in a plane parallel thereto up and down as respects the bar, said jaw having a clamping bracket on the back thereof comprising a pair of lateral jaws to pass about the sides of the main jaw and have capacity for movement up and down thereon, and a clamping screw passing through one of said lateral jaws for engagement with the main jaw to hold the auxiliary jaw in its adjusted position.

4. In a structure as set forth in claim 3, the provision on said clamping bracket of a hollow boss disposed behind the auxiliary jaw and open at the top and on the front side thereof to provide a socket, a headed portion provided on the back of the auxiliary jaw arranged to be entered through the open top of said boss into said socket, and a removable cotter pin arranged to retain said headed portion in said socket.

5. In a clamp having a bar, and a pair of rigid jaws mounted thereon so that one is adjustable toward the other for oppositely engaging work therebetween, an auxiliary jaw to be mounted in front of the face of one of said main jaws and having a clamping device on the back thereof adjustable vertically on said main jaw whereby said auxiliary jaw is arranged to be held in its adjusted position to suit the height of the work being handled, said clamp being provided with a socket portion, and said auxiliary jaw having a head received in said socket portion to permit universal tilting movement of said auxiliary jaw with respect to said clamp.

6. In a clamp having a bar, and a pair of rigid jaws mounted thereon so that one is adjustable toward the other for oppositely engaging work therebetween, an auxiliary jaw to be mounted in front of the face of one of said main jaws and having a clamping device on the back thereof adjustable vertically on said main jaw whereby said auxiliary jaw is arranged to be held in its adjusted position to suit the height of work being handled, said clamp being provided with a socket portion, and said auxiliary jaw having a head received in said socket portion to permit universal tilting movement of said auxiliary jaw with respect to said clamp, and said auxiliary jaw having the lower end thereof bifurcated to straddle said bar when said jaw is adjusted near its lowermost position.

JOHN RYDEN.
CARL GUSTAVSON.